US009797985B2

(12) United States Patent
Tseng et al.

(10) Patent No.: US 9,797,985 B2
(45) Date of Patent: *Oct. 24, 2017

(54) MULTI-FACTOR LOCATION VERIFICATION

(71) Applicant: Facebook, Inc., Menlo Park, CA (US)

(72) Inventors: Erick Tseng, San Francisco, CA (US); Yoon Kean Wong, Redwood City, CA (US); Yael Maguire, San Francisco, CA (US); Michael John McKenzie Toksvig, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,395

(22) Filed: May 26, 2017

(65) Prior Publication Data

US 2017/0261590 A1    Sep. 14, 2017

Related U.S. Application Data

(63) Continuation of application No. 13/842,767, filed on Mar. 15, 2013, now Pat. No. 9,715,003.

(51) Int. Cl.
*G01S 5/02* (2010.01)
*G01S 19/14* (2010.01)
*H04L 29/06* (2006.01)
*H04W 4/00* (2009.01)
*G06Q 20/32* (2012.01)

(52) U.S. Cl.
CPC .......... *G01S 5/0263* (2013.01); *G01S 5/0205* (2013.01); *G01S 19/14* (2013.01); *G06Q 20/3278* (2013.01); *H04L 63/107* (2013.01); *H04W 4/008* (2013.01)

(58) Field of Classification Search
CPC ..... H04W 12/06; H04W 12/08; G06F 21/565; G06F 12/1458
See application file for complete search history.

(56) References Cited

U.S. PATENT DOCUMENTS 7,310,534 B2    12/2007    Northcutt
9,715,003 B2 *    7/2017    Tseng ...................... G01S 19/14
2011/0239274 A1 *    9/2011    Heffez .................. H04L 9/0872
726/3

(Continued)

OTHER PUBLICATIONS

Examination Report No. 1 for AU Application No. 2014235429, dated May 30, 2017.

(Continued)

*Primary Examiner* — Dung Hong
(74) *Attorney, Agent, or Firm* — Baker Botts L.L.P.

(57) ABSTRACT

In one embodiment, a method includes accessing at least two determinations of the location of a mobile computing device, with each determined location having been determined without reference to explicit location information manually input by a user of the mobile computing device. At least one first determined location is compared with at least one second determined location, with comparisons being made between location determinations made based on different location determination input. A functionality associated with the mobile computing device is allowed if the first determined location corresponds to at least one of the second determined locations.

18 Claims, 5 Drawing Sheets

(56) References Cited

U.S. PATENT DOCUMENTS

| | | | | |
|---|---|---|---|---|
| 2011/0287779 A1* | 11/2011 | Harper | ............... | G01S 19/03 |
| | | | | 455/456.1 |
| 2013/0015947 A1* | 1/2013 | Best | ............ | G01S 19/14 |
| | | | | 340/5.7 |
| 2014/0179273 A1* | 6/2014 | Kim | ............... | H04W 4/025 |
| | | | | 455/411 |
| 2014/0274122 A1* | 9/2014 | Tseng | ............... | G01S 19/14 |
| | | | | 455/456.1 |

OTHER PUBLICATIONS

Notification of the Second Office Action for CN Application No. 201480026703.X.

* cited by examiner

MULTI-FACTOR LOCATION VERIFICATION

PRIORITY INFORMATION

This application is a continuation under 35 U.S.C. §120 of U.S. patent application Ser. No. 13/842,767 titled "MULTI-FACTOR LOCATION VERIFICATION" and filed 15 Mar. 2013.

TECHNICAL FIELD

This disclosure generally relates to electronic location determination.

BACKGROUND

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Verifying the location of a user of a mobile device can be an important part of identifying a mobile device or a user of the mobile device. For example, data about events such as a credit card swipe indicate that a user is performing an economic transaction at the location of the terminal where the card is swiped. If other location determination methods indicate that the user is in a different location, that information may call into question whether the user has actually authorized the credit card swipe, or is instead being scammed or defrauded.

The location of a user may be verified by accessing at least two determined locations of the user or a mobile device associated with the user. For example, a user's location may be determined by a GPS reading associated with the user's mobile device and by a radio-frequency identification between the mobile device and a kiosk at a known location. The two determinations may be compared with each other, and a functionality associated with user or a mobile device may be allowed or prohibited based on whether the compared locations correspond to each other. For example, a credit card swipe or access to a secure network may be allowed or denied based on the comparison.

DESCRIPTION OF EXAMPLE EMBODIMENTS

Figure 1:
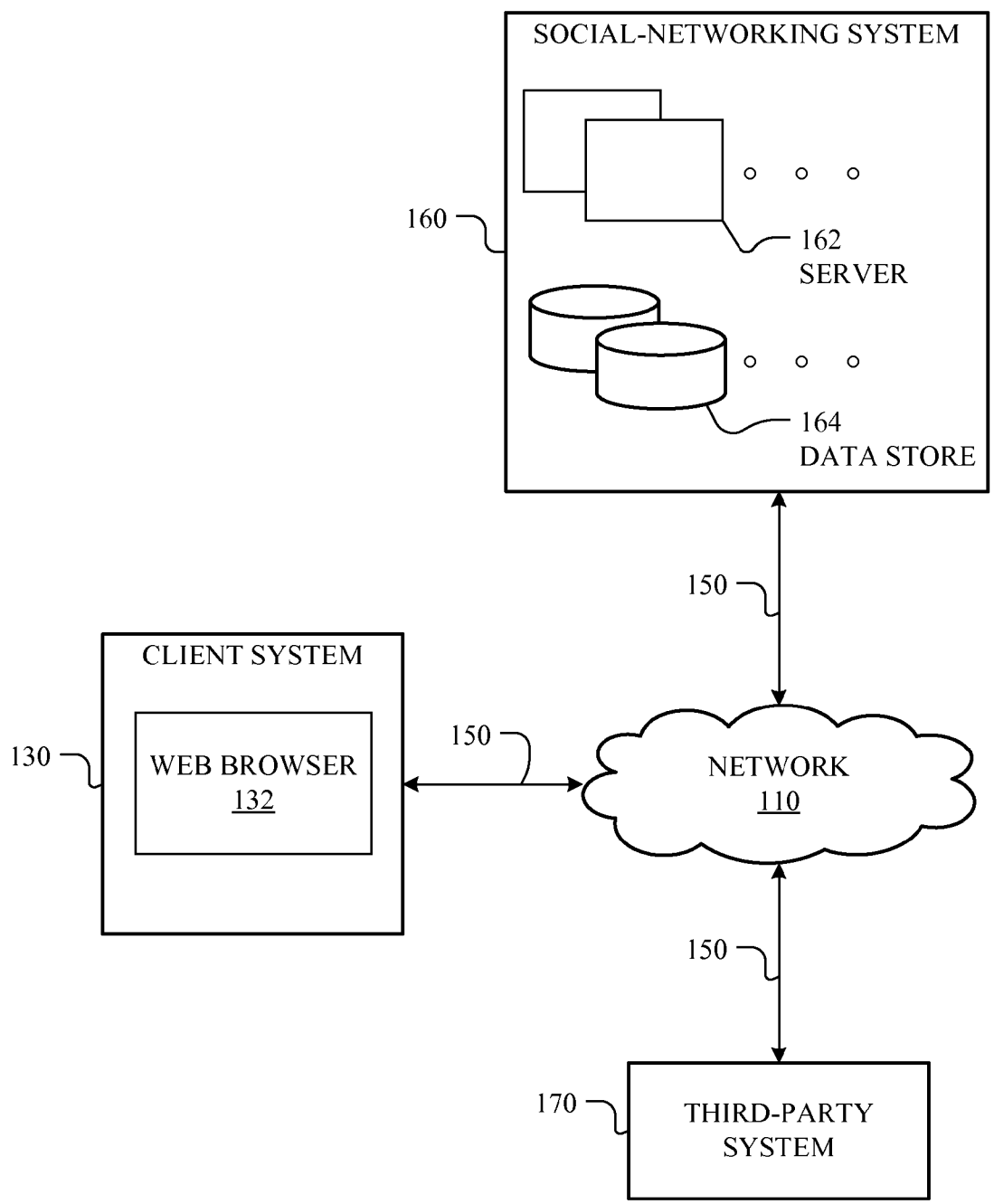
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
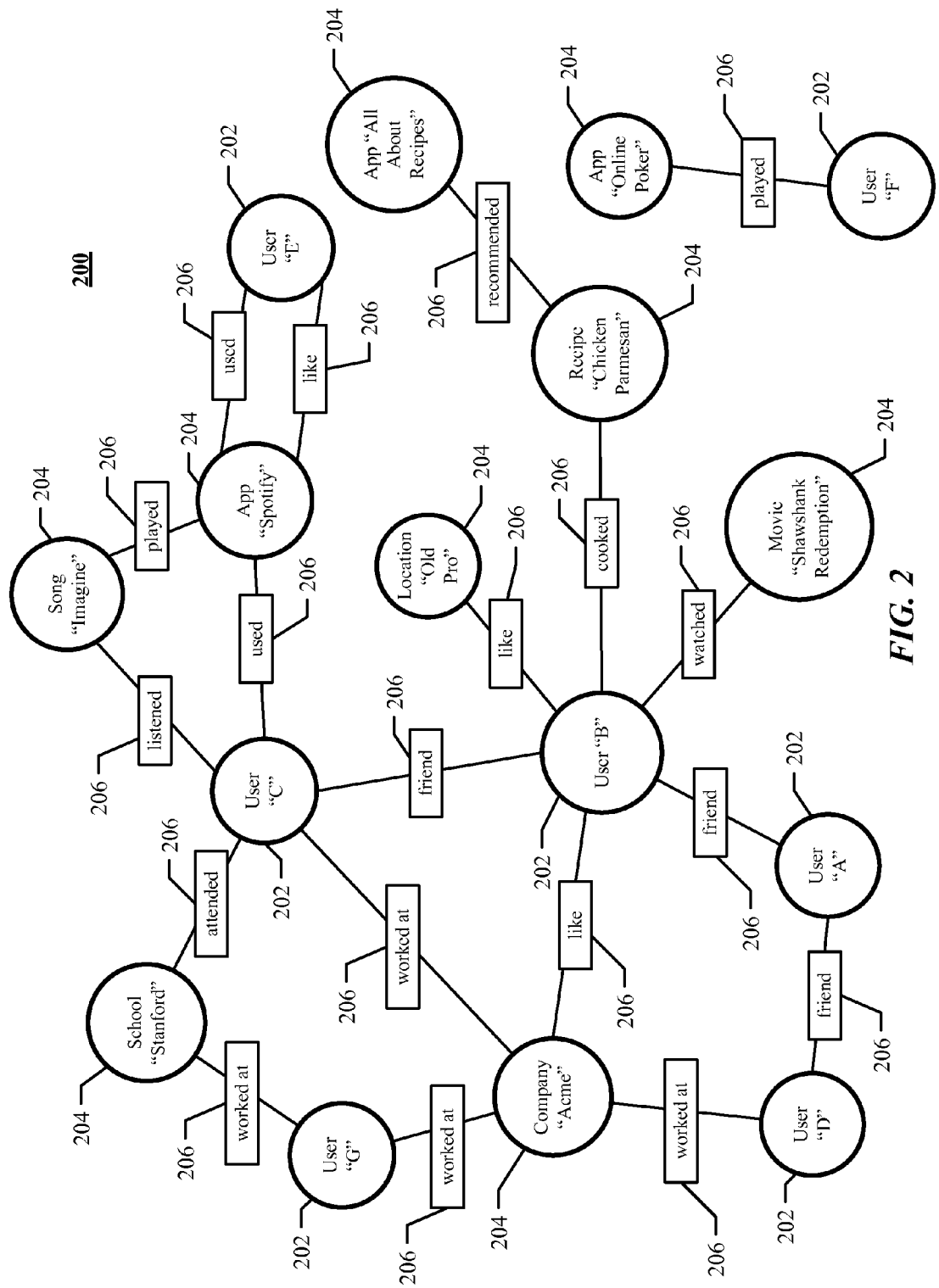
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to send to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Verifying the location of a user of a mobile device can be an important part of identifying a mobile device or a user of the mobile device. For example, data about events such as a credit card swipe indicate that a user is performing an economic transaction at the location of the terminal where the card is swiped. If other location determination methods indicate that the user is in a different location, that information may call into question whether the user has actually authorized the credit card swipe, or is instead being scammed or defrauded. If the user's location can be independently verified, the merchant can be more certain that the transaction is valid. In addition, the merchant can associate the located device or user with the transaction, providing the user with an experience tailored to that user. As another example, access to a wireless network may be limited to devices that are within a particular location, such as a business. If a device accessing the wireless network appears to be doing so from a location outside the business, such information may be an indicator that the device is gaining unauthorized access to the wireless network. As another example, a targeted advertisement may be displayed to select users at a given location. In order to display the advertisement to the correct individuals, the locations of the individuals must be accurately confirmed. While this disclosure describes specific examples of uses for identifying a mobile device, user of the mobile device, or their locations, this disclosure contemplates any suitable uses for the location or identify of a mobile device or user.

The location of a user of a mobile device may be determined using any suitable location determination method. In particular embodiments a location determination method may involve radio-frequency identification (RFID) communication. For example, a mobile device may have one or more RFID tags on or in the mobile device that communicates with an RFID reader. A tag may be unique to the mobile device or may be configured to provide multiple responses to an RFID reader, with each response being associated with one or more users of the mobile device. In particular embodiments, a location determination method may include scanning a barcode at a kiosk or other suitable terminal with a known location. For example, a barcode may be unique to a user or otherwise identify the user, thus identifying the user's location as that of the terminal used to scan the barcode. In particular embodiments, a location determination method may include interaction between a user's mobile device and another device, such as a Bluetooth device, a near-field communication (NFC) system, or another electronic device in the vicinity of the mobile device. For example, the interaction may include communicating location information of the mobile device. As another example, the interaction may identify the mobile device to the other device (or vice versa). If the other device is in a known location, then the location of the mobile device can be established. In particular embodiments, a location determination method may include interaction between a user's mobile device and network device with a known location. The interaction may identify the mobile device, establishing that the mobile device is in the vicinity of the located network component. The mobile device may be identified by any suitable method, such as by identifying the device's media access control (MAC) address or the device's wifi ID. In particular embodiments, a location determination method may be an interaction between the user and a device, such as a user's credit card swipe at a terminal with a known location. As another example, an interaction may establish the identity of the user, such as through biometric readers or voice recognition by a device with a known location. In particular embodiments, a location determination method may include locating a mobile device using GPS technology, triangulation of access points such as cell towers or network devices, etc. In particular embodiments, a location determination method may include advanced knowledge of the user's intended or estimated location, such as a reservation for an event at a particular time (e.g. restaurant, theater, concert, etc). As another example, a statement of a user's intentions such as on a social-networking system may include information from which the user's actual or intended location may be determined. In particular embodiments, a location determined method may include verifying the performance of explicit instructions to the user. For example, a user of a wireless network may be instructed to go to a specific location, and the user's performance (and thus location) may be validated by measuring e.g. the wireless signal strength as the user moves towards and arrives at the location. In particular embodiments, a location determination method may depend in part on information about the user, such as that associated with a social-networking system. For example, if a user is logged into a social-networking system, the system may be able to associate information about the users' devices with the user, validating the user's location. For example, a device's MAC address communicated with network access point may be associated with the user, and if the user is logged into the social network on the device, then the social network may automatically perform the association. As another example, an interaction with an RFID reader may communicate information to an application on the user's mobile device, and that application may be associated with the user by information contained in the social networking system. As another example, a user may be tagged in posts, photos, or other content associated with a social network, and the user's location may be determined from information associated with that tag, such as from an explicit statement of the user's location made by another user of the social network. In particular embodiments, a location determination method may include interaction between a magnetic field and a user device having a compass or other suitable magnetometer. In particular embodiments, the user can correlate their location using any other suitable location determination method, such as the MAC address of the user's device. As an example, a kiosk in a store can use a magnet stronger than the earth's magnetic field at store locations where a user is located. If the phone's magnetometer detects the magnetic field, the user's mobile device can send a message to the store's system correlating the spatially located MAC address and magnetic detection with an event (such as transferring the an identifier associated with a social network to a kiosk, making a purchase, etc.). In particular embodiments, instead of or in addition to a magnet and magnetometer, a location determination method may include a kiosk or other suitable device with a transducer that interacts with a user's mobile device. For example, the transducer may create one or more vibrations or vibration patterns (for example, such as those induced by tapping the device on the kiosk or other suitable device) which may be detected by an accelerometer in the user's mobile device. As another example, the user's mobile device may transmit one or more vibrations or vibration patterns to terminal, which are detected by a transducer in the terminal. In particular embodiments, instead of or in addition to a magnet and magnetometer, a location determination method may include the user' device having an ambient light sensor, such as a camera, that detects frequency or intensity of ambient light. As an example, the light may be created by a terminal or other suitable device. As another example, the user may photograph a barcode, such as a barcode produced by a terminal at a known location, using a camera on a device equipped with a bar code reader. In particular embodiments, instead of or in addition to a magnet and magnetometer, a location determination method may include the user's mobile device transmitting light to e.g. a kiosk in a store, which may detect the light to locate the device. For example, the device may transmit a particular frequency or intensity of light or a particular pattern of flashes, which are detected by the kiosk. In particular embodiments, instead of or in addition to a magnet and magnetometer, a location determination method may include detection of a sound by the mobile device, such as a particular frequency, duration, or pattern of sounds emitted by a kiosk. In addition or the alternative, the device may emit the sounds, which are detected by e.g. the kiosk. In particular embodiments, instead of or in addition to a magnet and magnetometer, a location determination method may include various RF methods, such as those using an RFID system described above. In particular embodiments, instead of or in addition to a magnet and magnetometer, a location determination method may include an interaction of a user with a kiosk or other suitable device at a known location. For example, the user may touch a particular pattern on a touch screen or particular portions of the touch screen, which are detected by the touch screen and indicate the use's location. The pattern may be displayed on e.g. a kiosk at a store for the user to contact. In particular embodiments, instead of or in addition to a magnet and magnetometer, a location determination method may include a store employee or other suitable individual indicating the presence of a user, such as by selecting a photo of the user. In particular embodiments, such indication may not require corroboration by another location determination method, such as by identifying a device's MAC address. While this disclosure describes particular examples of location determination methods or systems, this disclosure contemplates determining the location of a user by any suitable location determination method or system.

Figure 3:
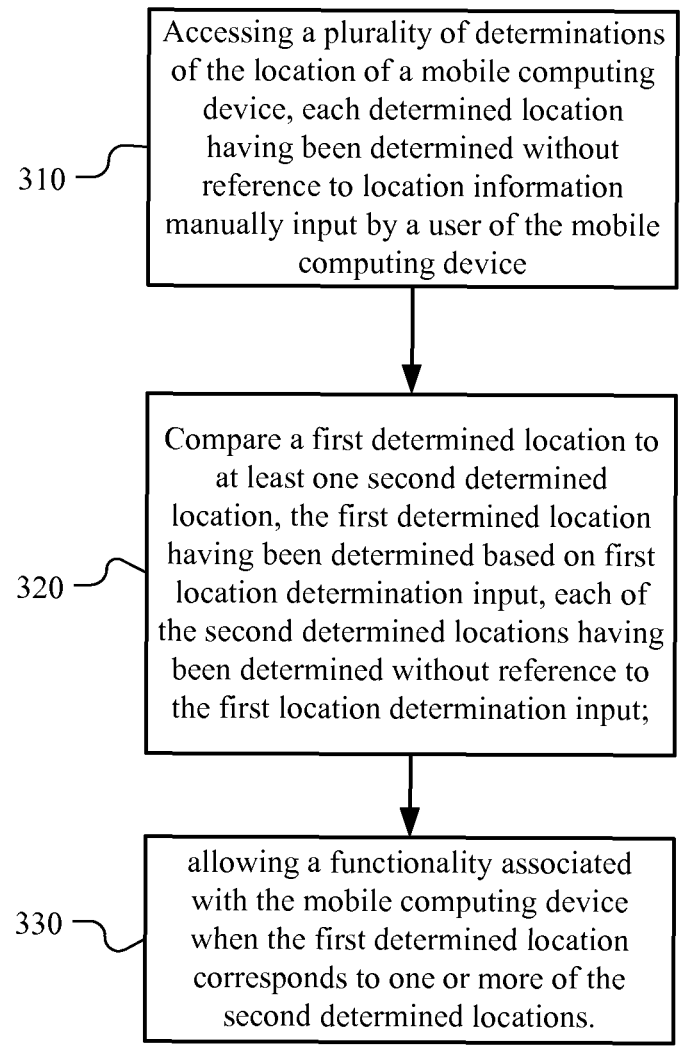
FIG. 3 illustrates an example method for verifying the location of an individual using multiple location factors.

FIG. 3 illustrates an example method 300 for verifying the location of a mobile device or user of the mobile device. The method may begin at step 310, where at least two determined locations of the mobile device are accessed. The determined locations may be determined by any suitable method or system, such as those described above. In particular embodiments, the determined locations have been determined without reference to explicit location information input by the user of the mobile device, such as geographic coordinates or a particular place indicating the user's location and input by the user using a computing device, or an explicit statement of the user's location such as a message or post on a social network stating "I am at San Francisco airport." This disclosure contemplates that the determined locations may be stored in and accessed from any suitable data storage structure in any suitable location, such as on the user's mobile device or on one or more remote servers, hard drives, etc. In particular embodiments, access to such information may be restricted, for example by a user's privacy settings.

At step 320, at least two determined locations are compared against each other. In particular embodiments, several determined locations may each be compared against each other. For example, four determined locations may be accessed and compared to each other, resulting in six comparisons. In particular embodiments, comparisons are performed between two determined locations only when the methods used to determine those locations use different location input. For example, if one location is determined using RFID communication and another is determined using a WiFi signal then those two determinations may be compared. If both locations were determined using the same method and using the same location determination input, then the comparison would not be made. However, it should be noted that a single location event may generate different location determination input, and locations determined using that separate input may be compared. For example, a single RFID communication may communicate information about a RFID tag and also communicate information about the device's MAC address, each of which are separate location determination inputs. In particular embodiments, comparisons may be performed between two determined locations only when both locations have been determined within a predetermined time of the comparison. For example, stale location determinations may be excluded from comparison. A predetermined time may be set by the entity executing the method, an entity interested in the results of comparison (e.g. bank, merchant, advertiser, etc.), by the user, etc. This disclosure contemplates comparison of location determinations being made by any suitable computing device using any suitable method or algorithm of comparing sets or items of data. For example, the comparison may be made by the user's mobile device or by one or more remote computing devices such as servers, remote desktops, etc.

At step 330, one or more functionalities associated with the mobile device or user of the mobile device are allowed when one or more comparisons of step 320 reveal that the compared location correspond to each other. In particular embodiments, the precision required for two determined locations to correspond to each other may be adjustable, for example by an entity interested in the results of the comparison or by the user of the mobile device. For example, a bank may require a more precise match than an advertiser. In particular embodiments, precision information may be determined from information associated with nodes or edge of a social-network. In particular embodiments, the precision required for two determined locations to correspond to each other may depend on one or both of the location determination methods used. A less sensitive location determination method may result in a lower degree of precision required. For example, if one location determination method is accurate to 10 meters and second method is accurate to 5 meters, then the determined locations may agree when the determined locations are within 15 meters of each other. More stringent requirements may also be used.

In particular embodiments, comparisons may be averaged, may be weighted, or not all comparisons may be used (e.g. only top rated comparisons may be used) to determine whether determined locations sufficiently correspond. In particular embodiments, functionality may be allowed when a predetermined number or percentage of comparisons agree with each other, such as for example when 75% or more comparisons correspond, taking into account precision requirements discussed above.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
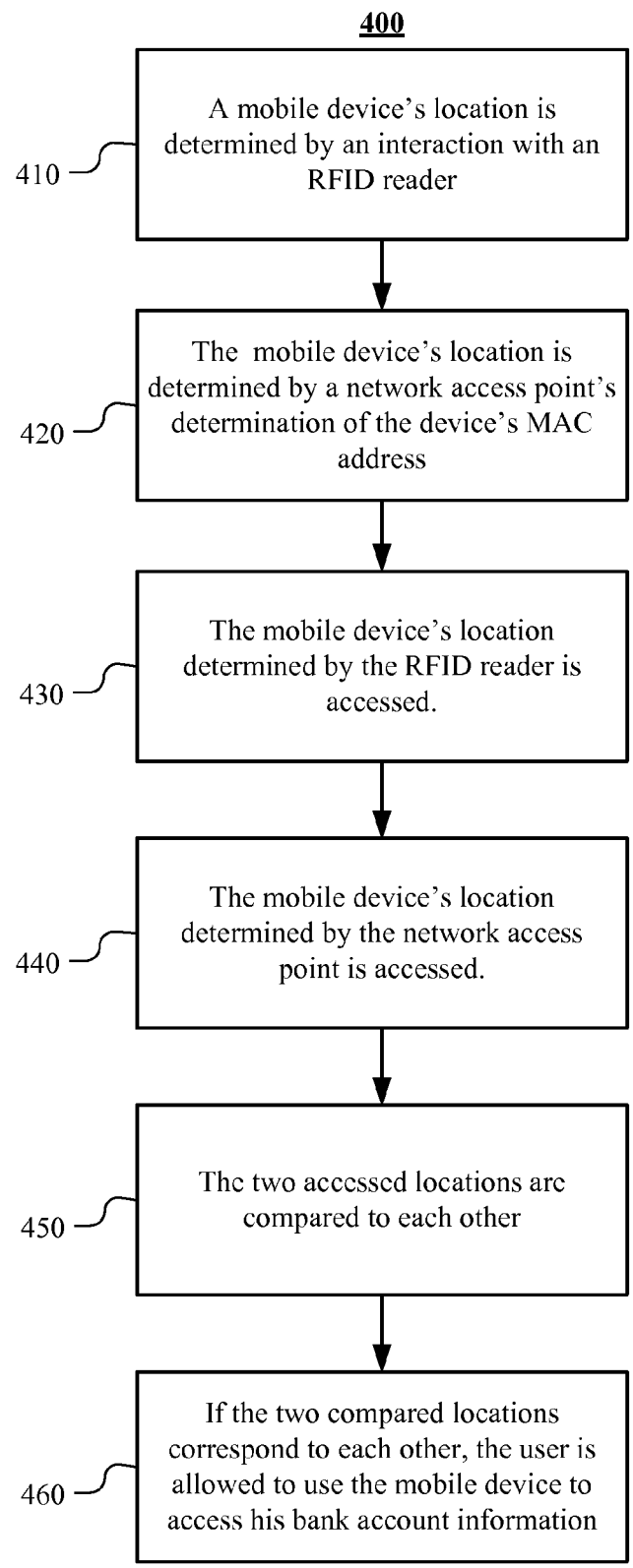
FIG. 4 illustrates an example method for verifying the location of a mobile device, using a specific example of comparing two example location determination methods.

FIG. 4 illustrates an example method 400 for verifying the location of a mobile device, using a specific example of comparing two example location determination methods. The method may begin at step 410, where the location of a mobile device is determined by the mobile device's interaction with a merchant's RFID reader at a kiosk at a known location. The user of the mobile device logs onto the merchant's wireless network, and at step 420 one of the merchant's wireless network access points at a known location determines the mobile device's MAC address, which is associated with the mobile device. The user of the mobile device decides to purchase something from the merchant and attempts to check the balance in his bank account by using his mobile device to access his account information. At step 430, the location determined by the interaction between the mobile device and the merchant's RFID kiosk is accessed. At step 440, the location determined by the merchant's wireless network access point is accessed. At step 450 the two locations are compared to each other. At step 460, if the two locations correspond to each other (perhaps taking into account the precision associated with each location determination method), the user is allowed to log in to his banking account.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

While the example method described above describes allowing functionality associated with the mobile device when two or more location determinations sufficiently correspond, steps 310 and 320 (and of course, steps 430-450) may be performed to determine when two or more location determinations do not sufficiently correspond, in which case a functionality associated with the mobile device may be prohibited. In particular embodiments, if every pair of compared location determinations do not sufficiently correspond, a functionality may be prohibited. In particular embodiments, when any two compared location determinations do not sufficiently correspond, a functionality may be prohibited. For example, a functionality may be prohibited if several location determinations correspond with each other but anther location determination disagrees with the others, particularly when the disagreement is large, taking into account precision requirements for the prohibition of a functionality. Such precision requirements may be the same as or different then the precision requirements to allow a functionality. In particular embodiments, a functionality may be prohibited when select ones of the comparisons do not sufficiently correspond, for example when the number of corresponding comparisons falls below a predetermined threshold, such as 25%.

In particular embodiments, a functionality associated with a user or a mobile device may include access to secure data. Secure data may include settings on the user's mobile device, a user's settings or preferences related to a software application (such as a social-networking application), information about a user's account (such as a bank account, online store account, etc), personal information about the user (such as passwords), or any other suitable secure data. In particular embodiments, a functionally associated with a user or a mobile device may include accessing a network or device by a secure connection, such as accessing a website over a https connection, accessing a secured network, etc. In particular embodiments, a functionality associated with a user or a mobile device may include the ability to engage in economic transactions, such as the ability to purchase something from an online or physical store, the ability to deposit or withdraw money from an account, etc. While this disclose describes specific examples of functionality that may be allowed or prohibited, this disclosure contemplates allowing or prohibiting any suitable functionality.

In particular embodiments, allowing or prohibiting a functionality may be based on trust factors associated with determined locations. For example, each determined location may have an associated trust factor indicating the trustworthiness of the determined location, such as e.g. the ease with which the location can be spoofed, whether the determined location has been authorized (such as by being associated with the location of a credit card terminal under the control of a merchant or a network device under control of a trusted network provider), etc. In particular embodiments, allowing or prohibiting a functionality may be based on the trust factor of a single determined location. For example, having one determined location with a very high trust factor and that corresponds to another determined location as described in step 330 may be sufficient to allow the functionality. In particular embodiments, allowing or prohibiting a functionality may be based on the trust factors associated with each of two compared determined locations. For example, a functionality may be allowed if each determined location in a comparison has a sufficiently high trust factor associated with the determination. As another example, a functionality may be allowed when a certain number of percentage of the comparisons include determined locations having a sufficiently high trust factor associated with the determination. In particular embodiments, allowing or prohibiting a functionality may be based on a degree of correspondence between comparisons. For example, an overall trust factor may be determined based on how well two or more comparisons agree with each other. In particular embodiments, allowing or prohibiting a functionality may be based on an overall trust factor having a higher (or lower) value than a predetermined trust-factor threshold. For example, the overall trust factor may be based on the trust factors associated with the trust factors of the compared determined locations and the results of those comparisons. In particular embodiments, trust factors may be determined from information associated with a social-networking system (such as user settings or preferences), information about the reliability of locations determined using particular methods or from particular places generally, or information associated with user's having one or more characteristics similar to the user whose location or mobile device location is being determined.

Figure 5:
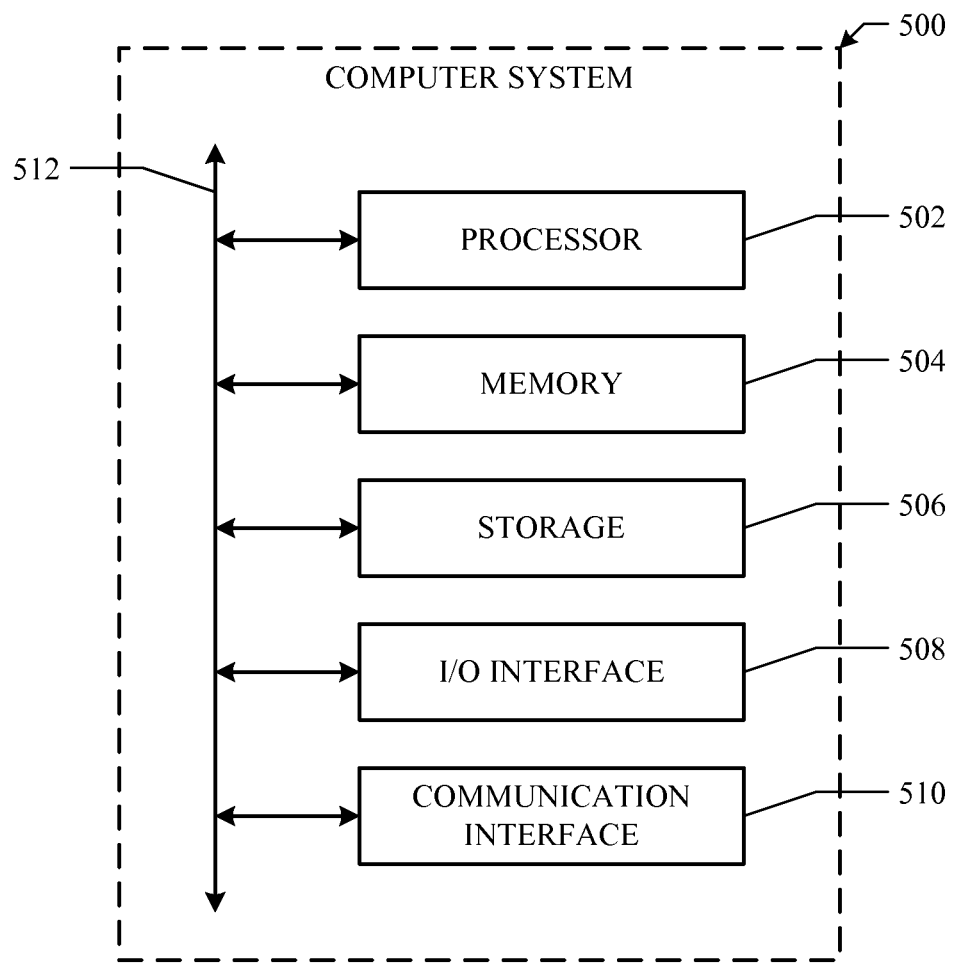
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them.

During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. One or more computer-readable non-transitory storage media embodying software that is operable when executed to:
    access a plurality of determinations of the location of a user of a mobile computing device, each determined location having been determined without reference to explicit location information manually input by a user of the mobile computing device,
    compare a first determined location with at least one second determined location, the first determined location having been determined based on first location determination input, each of the second determined locations having been determined without reference to the first location determination input; and
    prevent a functionality associated with the mobile computing device or a user of the mobile computing device when the first determined location does not correspond to one or more of the second determined locations,
    wherein the first determined location and at least one of the second determined locations were determined within a predetermined time of the comparison.

2. The media of claim 1, wherein the first location determination input comprises one or more of:
    communication between the mobile computing device and a radio-frequency identification system;
    communication between the mobile computing device and a near-field communication system;
    communication between the mobile computing device and a wireless network device;
    a GPS determination; or
    information associated with an economic transaction associated with the user.

3. The media of claim 1, wherein the user is a user of social network comprising a social graph that comprises a plurality of nodes and edges connecting the nodes, with at least one node in the social graph corresponding to the user; and
    at least one of the first or second determined location is determined based on information associated with at least one of the plurality of nodes or edges in the social-networking system.

4. The media of claim 1, wherein the first determined location corresponds to one of the one or more second determined locations when the correspondence is within a predetermined precision.

5. The media of claim 4, wherein the precision is based on one or both of the method used to determine the first determined location and the method used to determine one of the one or more second determined locations.

6. The media of claim 1, wherein the functionality comprises one or more of:
    accessing one or more settings associated with mobile computing device;
    accessing one or more accounts associated with the user;
    accessing restricted or secure data;
    accessing restricted or secure networks;
    accessing an application on the mobile computing device;
    communicating, using the mobile computing device, with another computing device;
    providing information relating to the user to a third party;
    providing information related to the third party to the user; or
    engaging in economic transactions.

7. The media of claim 1, wherein the software is further operable when executed to:
    access a value of a first trust factor associated with the first determined location;
    for each of the second determined locations:
        access a value of a second trust factor associated with the second determined location;
        determine a value of a third trust factor based on the first trust factor, second trust factor, and the comparison; and
    prohibit the functionality when the value of one or more of the third trust factors falls below a value of a predetermined trust-factor threshold associated with the functionality.

8. The media of claim 7, wherein the user is a user of social network comprising a social graph that comprises a plurality of nodes and edges connecting the nodes, with at least one node in the social graph corresponding to the user; and
    at least one of the first, second, or third trust factor is determined based on information associated with at least one of the plurality of nodes or edges in the social-networking system.

9. The media of claim 7, wherein the user is a user of social network comprising a social graph that comprises a plurality of nodes and edges connecting the nodes, with at least one node in the social graph corresponding to the user; and
    the value of the predetermined trust-factor threshold is determined based on information associated with at least one of the plurality of nodes or edges in the social-networking system.

10. A system comprising: one or more computer-readable non-transitory storage media embodying instructions; and one or more processors coupled to the media and operable to execute the instructions to:

access a plurality of determinations of the location of a user of a mobile computing device, each determined location having been determined without reference to explicit location information manually input by a user of the mobile computing device, compare a first determined location with at least one second determined location, the first determined location having been determined based on first location determination input, each of the second determined locations having been determined without reference to the first location determination input; and prevent a functionality associated with the mobile computing device or a user of the mobile computing device when the first determined location does not correspond to one or more of the second determined locations, wherein the first determined location and at least one of the second determined locations were determined within a predetermined time of the comparison.

11. The system of claim 10, wherein the first location determination input comprises one or more of:
communication between the mobile computing device and a radio-frequency identification system;
communication between the mobile computing device and a near-field communication system;
communication between the mobile computing device and a wireless network device;
a GPS determination; or
information associated with an economic transaction associated with the user.

12. The system of claim 10, wherein the user is a user of social network comprising a social graph that comprises a plurality of nodes and edges connecting the nodes, with at least one node in the social graph corresponding to the user; and
at least one of the first or second determined location is determined based on information associated with at least one of the plurality of nodes or edges in the social-networking system.

13. The system of claim 10, wherein the first determined location corresponds to one of the one or more second determined locations when the correspondence is within a predetermined precision.

14. The system of claim 13, wherein the precision is based on one or both of the method used to determine the first determined location and the method used to determine one of the one or more second determined locations.

15. The system of claim 10, wherein the functionality comprises one or more of:
accessing one or more settings associated with mobile computing device;
accessing one or more accounts associated with the user;
accessing restricted or secure data;
accessing restricted or secure networks;
accessing an application on the mobile computing device;
communicating, using the mobile computing device, with another computing device;
providing information relating to the user to a third party;
providing information related to the third party to the user; or
engaging in economic transactions.

16. The system of claim 10, wherein the processors are further operable when executing the instructions to:
access a value of a first trust factor associated with the first determined location;
for each of the second determined locations:
access a value of a second trust factor associated with the second determined location;
determine a value of a third trust factor based on the first trust factor, second trust factor, and the comparison; and
prohibit the functionality when the value of one or more of the third trust factors falls below a value of a predetermined trust-factor threshold associated with the functionality.

17. The system of claim 16, wherein the user is a user of social network comprising a social graph that comprises a plurality of nodes and edges connecting the nodes, with at least one node in the social graph corresponding to the user; and
at least one of the first, second, or third trust factor is determined based on information associated with at least one of the plurality of nodes or edges in the social-networking system.

18. The system of claim 16, wherein the user is a user of social network comprising a social graph that comprises a plurality of nodes and edges connecting the nodes, with at least one node in the social graph corresponding to the user; and
the value of the predetermined trust-factor threshold is determined based on information associated with at least one of the plurality of nodes or edges in the social-networking system.

* * * * *